(12) United States Patent
Wang

(10) Patent No.: US 8,107,949 B1
(45) Date of Patent: Jan. 31, 2012

(54) SELECTIVE LOGGING OF DRIVE TESTING DATA DEPENDING ON REVERSE LINK DATA TRANSMISSION RATE

(75) Inventor: Hui Wang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1110 days.

(21) Appl. No.: 11/926,621

(22) Filed: Oct. 29, 2007

(51) Int. Cl.
*H04W 24/00* (2009.01)
(52) U.S. Cl. .............. 455/423; 455/67.11; 455/67.14
(58) Field of Classification Search .......... 455/423, 455/67.11, 67.14
See application file for complete search history.

(56) References Cited

U.S. PATENT DOCUMENTS

| | | | |
|---|---|---|---|
| 5,451,839 A * | 9/1995 | Rappaport et al. ............ 375/224 |
| 6,006,095 A | 12/1999 | Bernadin et al. |
| 6,336,035 B1 * | 1/2002 | Somoza et al. ............... 455/446 |
| 6,606,494 B1 * | 8/2003 | Arpee et al. ................ 455/422.1 |
| 6,711,404 B1 * | 3/2004 | Arpee et al. .................. 455/423 |
| 6,754,487 B1 * | 6/2004 | Sanders et al. ............... 455/423 |
| 6,947,835 B2 | 9/2005 | Kaplan et al. ................ 701/207 |
| 7,079,945 B1 | 7/2006 | Kaplan ........................ 701/208 |
| 7,236,779 B2 * | 6/2007 | Lahav et al. ................. 455/423 |
| 7,643,936 B1 | 1/2010 | Boxberger et al. ........... 701/208 |
| 2002/0009992 A1 * | 1/2002 | Jensen ......................... 455/422 |
| 2002/0063656 A1 * | 5/2002 | Gutowski ..................... 342/360 |
| 2004/0220725 A1 | 11/2004 | Cheng ......................... 701/207 |
| 2004/0230373 A1 | 11/2004 | Tzamaloukas ............... 701/208 |
| 2005/0267677 A1 | 12/2005 | Poykko et al. ............... 701/207 |
| 2006/0095349 A1 | 5/2006 | Morgan et al. ................ 705/29 |
| 2006/0129317 A1 | 6/2006 | Farmer et al. ................ 701/213 |
| 2007/0254644 A1 * | 11/2007 | Dobson et al. ............... 455/423 |

* cited by examiner

*Primary Examiner* — Nick Corsaro
*Assistant Examiner* — Sowmini Nair

(57) ABSTRACT

A method and mobile diagnostic measurement tool is described for collecting cellular network performance data. The method includes determining a current data rate for transmission of data between the measurement tool and a network node in a cellular network. The measurement tool includes a controller adaptively controlling the collection of network performance data by one or more data collection units in the measurement tool in accordance with variations in the current data rate. The collection of data is controlled so as to keep the total rate of collection of data to be less than or equal to the rate at which the data is transmitted to the network node. A memory in the tool may stored log mask tables which indicate which types of performance data can eliminated in the collection process depending on the transmit data rate.

15 Claims, 6 Drawing Sheets

| | | LOG LEVEL TABLE 52 | | | |
|---|---|---|---|---|---|
| REVERSE LINK RATE | LI PACKET | SPRINT CDMA VOICE 32 | EVDO REV. A 34 | VERIZON CDMA VOICE 36 | EVDO REV. A 38 | CINGULAR GSM VOICE 40 | HSPDA |
| ... | ... | ... | ... | ... | ... | ... | ... |
| 76.8 | 2048 | LOW | LOW | LOW | LOW | NA | NA |
| 153.6 | 4096 | MEDIUM | MEDIUM | MEDIUM | MEDIUM | LOW | LOW |
| ... | ... | ... | ... | ... | ... | ... | ... |
| 460.8 | 3072 | HIGH | HIGH | MEDIUM | MEDIUM | MEDIUM | MEDIUM |
| ... | | | | | | | |

NOTE: Y=LOG, N=DON'T LOG, X=DOES NOT APPLY

| | | INVEX-SAMSUNG A640 (CDMA-1X) | INVEX-SAMSUNG A340 (CDMA-1X) | HIGH LOG MASK NOVATEL MERLIN S720 (EVDO) | 50C SIERRA WIRELESS 595 (EVDO) | |
|---|---|---|---|---|---|---|
| INVEX CODEC | INVEX MASK | | | | | |
| QCP CODEC | COLLECT FINGER INFORMATION | Y | Y | Y | Y | ... |
| | COLLECT SPARSE AGC INFORMATION | Y | Y | Y | Y | |
| | COLLECT MARKOV STATISTICS | N | N | N | N | |
| | PHONE STATE | Y | Y | Y | Y | |
| | PHONE STATUS | Y | Y | Y | Y | |
| | PILOT SETS | Y | Y | Y | Y | |
| 202 { | PARAMETER RETRIEVAL 2 — 216 | N | N | N | N | |
| | TEMPORAL ANALYZE | Y | Y | Y | Y | |
| | SEARCHER INFO-ACTIVE SET | N | N | N | N | |
| | SEARCHER INFO-CANDIDATE SET | N | N | N | N | |
| | SEARCHER INFO-NEIGHBOR SET | N | N | N | N | |
| | SEARCHER INFO-REMAINING SET | N | N | N | N | |
| | DECIMATE FINGER AND SEARCHER INFO | Y | Y | Y | Y | |
| | ENABLE HANDSET DEBUG (STREAMING DMSS ONLY) | N | N | N | N | |
| QCP 1X CODEC | IS-95B-FRAME ERROR RATE | Y | Y | Y | Y | |
| | F-SCH WALSH CODES | Y | Y | Y | Y | |
| | PARAMETER RETRIEVAL | N | N | N | N | |
| | BAND CHANGE | Y | Y | Y | Y | |
| | FORWARD LINK FRAME TYPES | Y | Y | Y | Y | |
| | REVERSE LINK FRAME TYPES — 218 | Y | Y | Y | Y | |
| | FAST FORWARD POWER CONTROL | Y | Y | Y | Y | |
| | REVERSE POWER CONTROL | Y | Y | Y | Y | |
| | SERVICE CONFIGURATION | Y | Y | Y | Y | |
| | RLP STATISTICS | Y | Y | Y | Y | |
| | ACTIVE SET INFO | Y | Y | Y | Y | |
| | EXTENSIBLE PARAMETER RETRIEVAL | N | N | N | N | |

...

US 8,107,949 B1

SELECTIVE LOGGING OF DRIVE TESTING DATA DEPENDING ON REVERSE LINK DATA TRANSMISSION RATE

BACKGROUND

In a cellular communication network, a geographic area served by the network is divided into a number of cell sites, each defined by a radio frequency (RF) radiation pattern from a respective base transceiver station (BTS) antenna. The BTS antennae in the cells are in turn coupled to a base station controller (BSC), which is then coupled to a telecommunications switch or other gateway, thereby facilitating communication with a telecommunications network such as the PSTN (public switched telephone network) or the Internet.

When a mobile station (such as a cellular telephone, personal digital assistant, or appropriately equipped portable computer, for instance) is positioned in a cell, the mobile station communicates via an RF air interface with the BTS antenna of the cell. Consequently, a communication path is established between the mobile station and the telecommunications network, via the air interface, the BTS, and the switch or gateway.

With the explosive growth in demand for wireless communications, network resources can be stressed. For instance, as the level of call traffic increases in a typical cell site, the likelihood of interference between mobile stations can increase substantially. In response to such an increase in call traffic, the base station of the cell may instruct all mobile stations in the cell to decrease their transmission power, and the base station may itself begin to communicate at a lower power level with each mobile station in the cell. With lower transmission power, however, call quality can diminish, and calls may ultimately be lost.

Further, changes to topography such as new building or growth or removal of trees can substantially effect the operation of a wireless network. For instance, as buildings and trees rise or fall in or around a cell site, the radiation pattern of the cell site may change drastically. As a result of new or changed signal reflections, for instance, the signal-to-noise ratio in or around the cell site may become unacceptably low and calls may be dropped.

To help manage the call traffic in congested or evolving areas and in other circumstances, a cellular telephony service provider may make changes to the network, such as by repositioning cell sites, subdividing cell sites into a number of sectors, adding new cell sites, or reallocating frequencies among various coverage areas. However, in order to effectively decide when and where such changes should be made, and to otherwise provide subscribers with acceptable and expected quality of service, a need has arisen to monitor the performance of the cellular network infrastructure.

One way to monitor cellular resources is to send technicians out into the field (i.e., into cell sites) with mobile diagnostic measurement (MDM) tools, to collect diagnostic data about network conditions. MDM tools are known and commercially available from companies such as ZK Celltest, Xcellon, Ericsson, and Agilent. Once the data is collected, the data can be analyzed (typically with a computer on the cellular provider network), and determinations can then be made about the state of the network and about what changes if any may be required.

Conveniently, the MDM tool may be carried in a vehicle such as a car, so that measurements can be made at various geographic locations. In one scenario, one technician drives the vehicle around town, while another technician in the vehicle operates the MDM tool so as to record information about the network. Alternatively, the MDM tool can simply be carried in the vehicle and can automatically collect information about the network.

Ideally, the MDM tool would further include a GPS receiver adapted to collect location data points indicative of where the MDM tool made its measurements. The MDM tool establishes a log file that includes records, each indicating measured network conditions and a corresponding geographic location. Further, the log file can include an MDM identifier that identifies the MDM tool that collected the data.

In most current MDM products, the MDM tool wirelessly transmits the log files to a central computer or server, via an RF transmitter in the MDM tool and a wireless packet data connection (e.g., via FTP) to a node in the wireless network. An analyst reviewing the data then makes decisions about allocation of system resources.

The process of driving or otherwise conveying an MDM tool around a given geographic area to collect network information is known as "drive testing." Conveniently, with the advent of automated MDM tools, a wireless carrier can arrange with a trucking company, taxicab company, public transportation company, or other carrier to mount MDM tools in various vehicles so as to collect network information from throughout a desired area as those vehicles drive along their routes, which are referred to as "drive test routes."

In its simplest configuration, a MDM tool includes (i) a first measurement device (e.g., mobile phone) that collects performance metrics (e.g., air interface condition data etc.), (ii) a computer coupled with the first measurement device for receiving the collected performance metrics and compiling them, and (iii) a transmitter (e.g., a second mobile phone) coupled to the computer, for receiving the collected performance metrics from the computer and transmitting them via an air interface and radio access node connection to a server. At the server, the data is compiled, reported, and analyzed, e.g., to facilitate making improvements to the network.

In typical practice, MDM tools (drive test units) are more complex than this, however. The MDM tool may take the form of a chassis that couples together (i) a wireless modem card for wirelessly reporting collected performance metrics, (ii) a CPU/controller, and (iii) up to n test phones, where n is some integer greater than 1, such as 5 or 10. The controller can control the various phones to cause them to do various things (such as placing calls, interacting with location-determination systems, engaging in signaling messaging, etc.), and the controller can collect information about the actions and results/responses/conditions with respect to those test phones. All of that logged data can be compiled into one file, with portions of the file corresponding to various ones of the test phones in particular slots of the chassis. Alternatively, separate files could be generated for the various test phones.

Background prior art references disclosing the state of the art in analysis of cell coverage in wireless networks and strategies for drive test routes include the following patents, each of which is incorporated by reference herein: Sanders et al., U.S. Pat. No. 6,754,487; Arpee et al., U.S. Pat. No. 6,711,404; Somoza, U.S. Pat. No. 6,336,035; Arpee et al., U.S. Pat. No. 6,606,494; Bernadin et al., U.S. Pat. No. 6,006,095; Rappaport et al., U.S. Pat. No. 5,451,839; Gutowski, U.S. Patent Application Publication US 2002/0063656; and Jensen, U.S. Patent Application publication US 2002/0009992.

Overview

Concurrent collection of data from a drive test units and transmission over the reverse link to a network node may not work in some situations, because the reverse link data rate (from the modem card to the BTS) may be limited due to poor signal conditions between the MDM tool and the nearest base transceiver station. The MDM tool may accumulate a vast amount of network performance data and not be able to send it quickly enough. Thus, a backlog of performance data builds up in the MDM tool's memory. In current practice, after the vehicle carrying the MDM tool has completed the drive test route (e.g., at the end of the day), the tool continues to operate on internal battery power to continue transmitting the backlogged data to the network server.

There are several deficiencies with this approach. In particular, the battery in the MDM tool could ultimately die before all of the backlogged data has been sent. Thus, the remaining data would not be sent until the next day when the drive test unit is powered up with vehicle power. Additionally, the current approach may result in a substantial amount of drive data being transmitted many minutes or hours after it was collected. This delay in transmission of data is undesirable because it does not permit reallocation of network resources based on current conditions to occur.

This disclosure provides a solution to the problem of accumulation of a backlog of drive test data and late reporting of cellular network conditions. This result is achieved by adaptively controlling the collection of cellular network performance data in a predetermined manner so as to enable the rate of collection or logging of drive test data to be commensurate with (i.e., not exceed) the rate at which such data can be transmitted over the MDM tool's RF interface to the cellular network. The disclosed embodiments achieve real time acquisition and transmission of data to the cellular network throughout the entire drive test. When the transmit data rate varies up or down, the collection of selective cellular network performance metrics are either dropped or added in. The designer of the MDM tool can dictate which performance metrics are dropped or added in as the data rate varies, and code these in the form of a table or tables (log mask tables herein) which are consulted as the transmission data rate varies.

In one particular aspect of the disclosure, a drive test measurement tool for measuring performance of a cellular network is disclosed. The measurement tool includes a plurality of data collection units collecting cellular network performance data. The data collection units may take the form of mobile telephones or specialized wireless communications devices designed specifically for the purpose of measuring cellular network performance. The drive test measurement tool further includes a transmitter for transmitting the cellular network performance data to a node in the cellular network. The measurement tool also includes an adaptive controller which is coupled to the plurality of data collection units. The controller controls the collection of cellular network performance data by the data collection units in accordance with variations in the current data rate of the transmitter. The rate of the collection of the cellular network performance data by the data collection units is adaptively controlled by the controller so as to be less than or equal to the current data rate, thereby enabling the drive test measurement tool to transmit all the data collected by the data collection units to the network node substantially in real time (i.e., as it is being logged).

In another aspect, a method of collecting cellular network performance data in a measurement tool is disclosed. The method includes the steps of (a) determining a current data rate for transmission of data between the measurement tool and a network node in a cellular network; and (b) adaptively controlling the collection of network performance data by data collection units in the measurement tool in accordance with variations in the current data rate so as to keep the total rate of collection of data to be less than or equal to the rate at which the data may be transmitted to the network node.

In another aspect, a cellular service provider system is disclosed. The service provider system includes a network providing cellular telephony services to roaming subscribers, a drive test server configured to analyze drive test routes, and a plurality of drive test measurement tools. Each of the drive test measurement tools includes (a) a plurality of data collection units collecting performance data of the network, (b) a transmitter for transmitting the cellular network performance data to a node in the network; and (c) an adaptive controller coupled to the plurality of data collection units controlling the collection of cellular network performance data by the data collection units in accordance with variations in the current data rate of the transmitter. The rate of the collection of the cellular network performance data by the data collection units is adaptively controlled by the controller so as to be less than or equal to the current data rate, thereby enabling the drive test measurement tool to transmit all the data collected by the data collection units to the node substantially in real time.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 4 is an illustration of a portion of a log level table maintained in memory in the measurement tool of FIG. 2. The log level table indicates which log mask table (FIGS. 5-7) to use depending on the current data rate ("reverse link rate").

FIG. 7 is an illustration of a portion of a "high" log mask, which is used when the current data rate is a relatively high rate. The log mask indicates which of the available, pertinent cellular network performance metrics are to be logged (i.e., recorded) and which are not logged in periods of "high" data rates. Again, as with FIGS. 5 and 6, the mask includes logging instructions which are specific to particular data collection units.

DETAILED DESCRIPTION OF PREFERRED EMBODIMENTS

Overview

Figure 1:
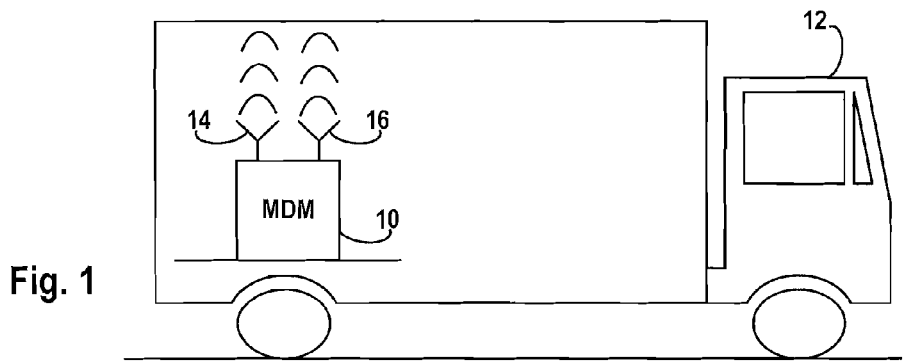
FIG. 1 is an illustration of a vehicle which carries a mobile diagnostic measurement (MDM) tool around a drive test route to capture performance characteristics of a cellular network.

FIG. 1 is an illustration of a measurement (MDM) tool 10 which is carried by a vehicle 12 along a drive test route in order to capture performance characteristics of a cellular network. The MDM 10 tool includes an antenna 14 which receives signals from orbiting Global Positioning System (GPS) satellites in order to record the geographical locations of where performance characteristics of a cellular network are recorded. The MDM tool 10 also includes an RF antenna 16 which is used to relay drive test (cellular network performance) data over an air interface to a network node in the cellular network. This network node may be a base transceiver station (BTS) or a set of base transceiver stations depending on the route taken by the driver of the vehicle 12. The data rate upon which the transmitter in the MDM tool 10 may transmit drive test data via the antenna 16 to the network node may vary during the drive test, e.g., due to entering areas of low signal, obstructions/terrain, and distance from nearest BTS. The method and MDM tool 10 of this disclosure is designed to adaptively control the rate of collection of drive test data by data collection devices in the MDM tool 10 in order that the rate of data collection is less than or equal to the transmission rate in order to enable the MDM tool 10 to both collect and transmit data to the network continuously in substantially real time, i.e., without the building up of a substantial backlog of data and the concomitant delay in reporting drive test data, as explained previously.

To do so, the MDM tool 10 implements a method of collecting cellular network performance data which includes the steps of: a) determining a current data rate for transmission of data between the measurement tool 10 and a network node (e.g., BTS) in a cellular network; and (b) adaptively controlling the collection of network performance data by data collection units in the measurement tool 10 in accordance with variations in the current data rate, so as to keep the total rate of collection of data to be less than or equal to the rate at which the data may be transmitted to the network node.

As will be explained subsequently, in order to adaptively control the data collection the MDM 10 includes a controller which governs the acquisition of cellular performance data. The controller may selectively turn on or off collection of certain types of performance metrics, depending on the number and type of particular data collection devices which are present in the MDM tool 10. The controller may make reference to the tables of FIGS. 4-7 in order to adaptively control the collection of data. The information in the tables of FIGS. 4-7 is typically prepared off-line by a drive test engineer. The information in the tables may be unique to a particular MDM tool 10 and the types of drive test collection devices in the particular tool, or generic tables may be created which are designed to cover every possible scenario of data transmission rate and type of data collection units which may be present in the MDM tool. A given MDM tool may have data collection units for different cellular service providers. The content and use of the tables will be described with greater detail later on.

MDM Tool Design

Figure 2:
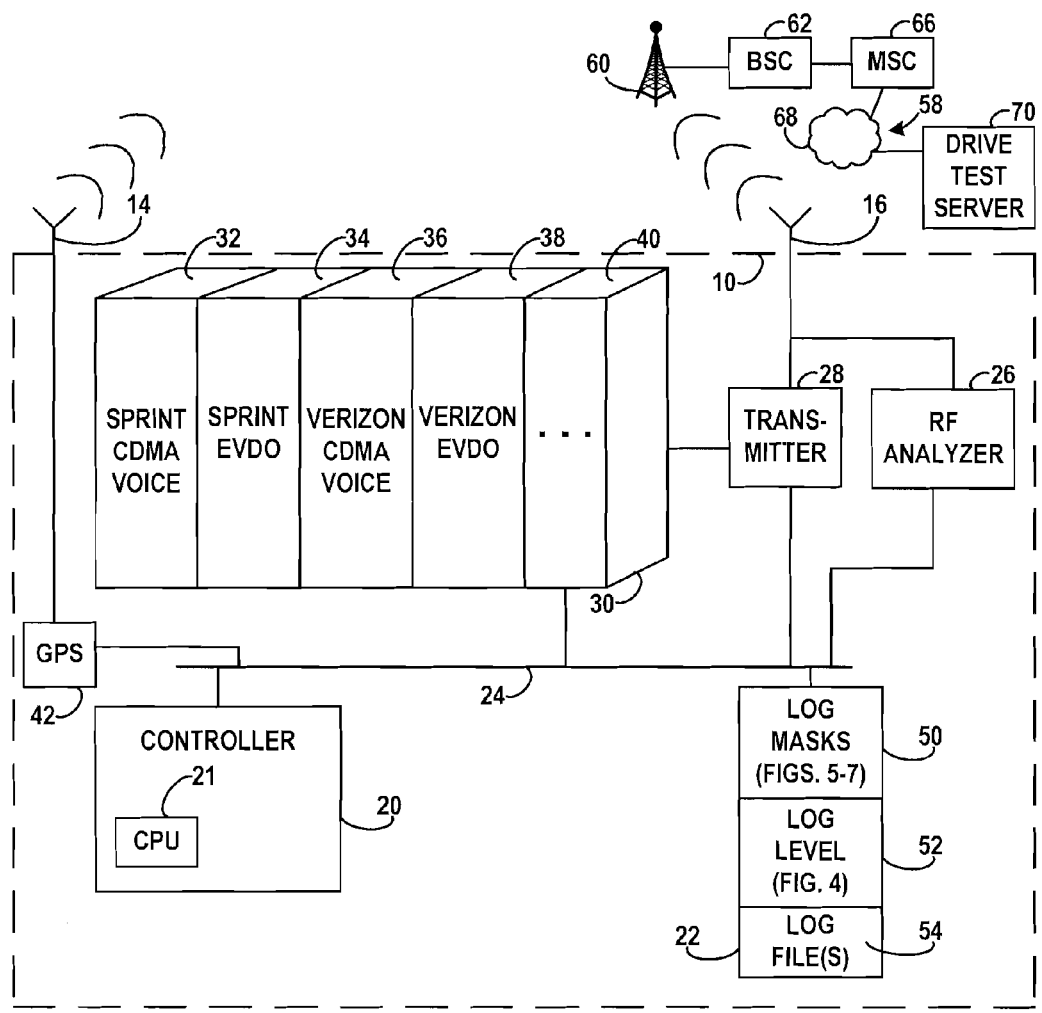
FIG. 2 is block diagram of the measurement tool of FIG. 1 and showing a drive test server on a cellular network which receives the measurement data from the measurement tool.

FIG. 2 is block diagram of the measurement tool 10 of FIG. 1 showing the tool 10 in more detail. The tool 10 includes an adaptive controller 20 and associated central processing unit 21, which controls the acquisition of cellular network performance data by a plurality of data collection units 32, 34, 36, 38, 40. The data collection units are shown housed in a chassis 30. The collection units 32, 34, 36, 38, 40 may take the form of wireless telephones or data collection devices specifically designed for purposes of performance evaluation of cellular networks. The tool 10 also includes a memory 22 which store log masks 50 (FIGS. 5-7), a log level table 52 (FIG. 4) and log file(s) 54 containing performance data collected by the data collection devices 32, 34, 36, 38, 50.

The tool 10 also includes an RF analyzer 26. The RF analyzer 26 analyzes RF signals exchanged between the tool 10 and a BTS 60 of a cellular network 58 and determines the data transmission rate of a transmitter 28 adapted for transmission of data in the log file(s) 54 over the air interface to the BTS 60. The tool 10 includes a GPS module 42 which receives GPS signals from the GPS antenna 14 and supplies the GPS data to the memory 22 for storage in the log files 54, thereby providing positional information for the cellular network performance data that is acquired by the measurement devices 32, 34, 36, 38, 40.

The cellular network 58 includes a base station controller 62 coupled to the BTS 60 and a mobile switching center 66 coupled between the base station controller 62 and the cellular service provider enterprise network 68. A drive test sever 70 is located on the enterprise network 68. The drive test server 70 receives the drive test data in substantial real time from the MDM tool 10 via one or more BTSs 60 and network 68 as the MDM tool 10 is driven over a drive test route. The server 70 also performs analysis of the drive test data in accordance with program instructions. An analyst (not shown) typically works with the results produced by the drive test server 70 to formulate recommendations regarding allocation of cellular network resources to improve the quality of service.

Operation

Figure 3:
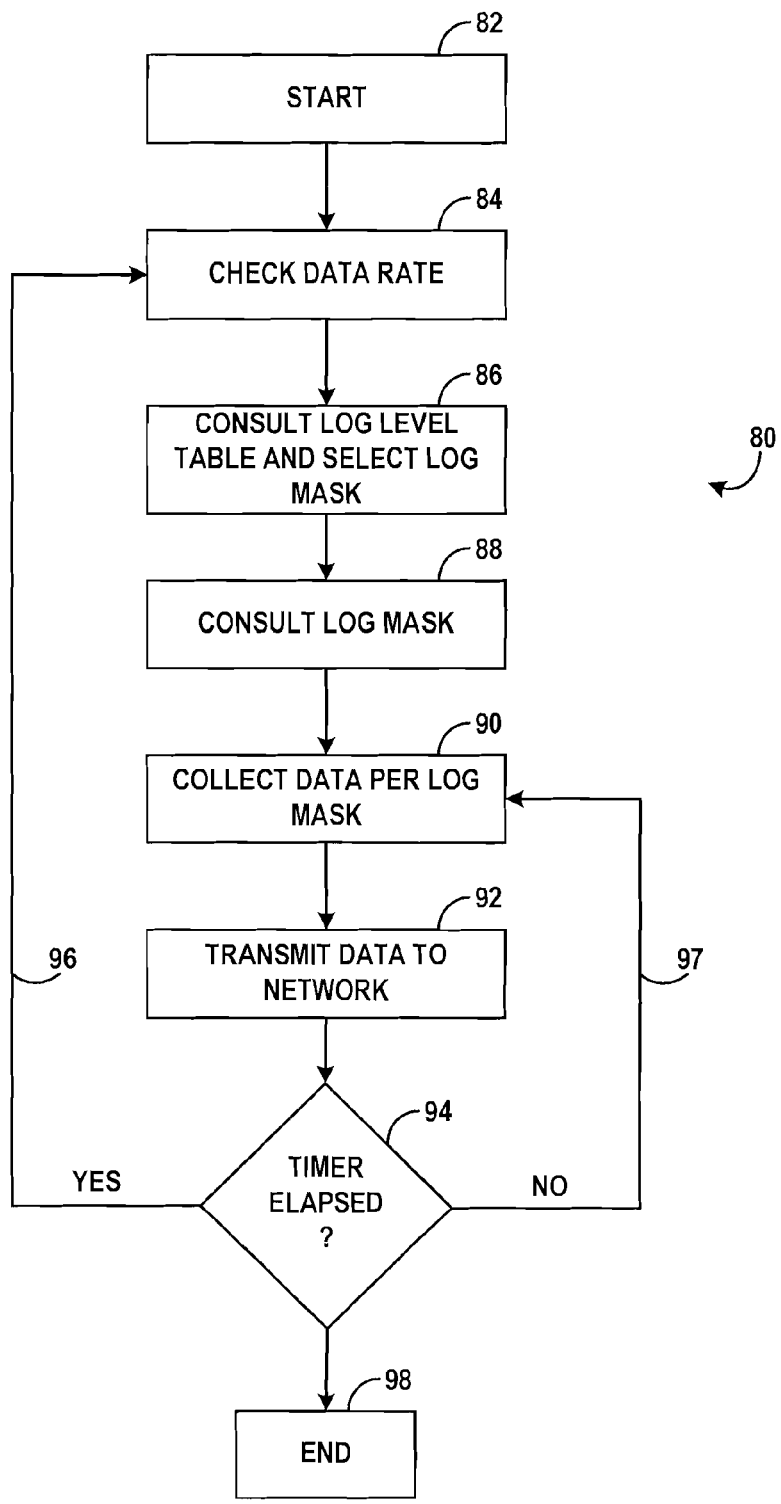
FIG. 3 is a flow chart showing the operation of the measurement tool of FIGS. 1 and 2 to adaptively control the collection of drive test data based on the data rate of transmission between the MDM tool and a network node in the cellular network.

FIG. 3 is a flow chart showing a process 80 governing the operation of the measurement tool 10 of FIGS. 1 and 2 to adaptively control the collection of drive test data based on the data rate of transmission between the MDM tool 10 and a network node (BTS 60) in the cellular network 58.

The process 80 starts as indicated at 82 when the drive test commences and data collection is initiated.

At 84, the controller 20 (FIG. 2) checks the current transmission data rate for the transmitter 28 (FIG. 2), e.g. by polling the RF analyzer 26. This transmission data rate is referred to herein interchangeably as the "reverse link data rate". The RF analyzer 26 either reports an instant transmission rate (e.g., 76.8 K bits per second) or a running average data transmission rate (e.g., average over some period of time such as the last five seconds). The RF analyzer may also report other reverse link data transmission characteristics, such as the size of the OSI level 1 packet (in bytes), the fraction of the available transmission rate which must be devoted to signaling functions (and thereby indicating the remainder available for data transmission), and the modulation technique used by the transmitter 28.

At step 86, the controller 20 consults a log level table 52 (FIGS. 1 and 4) and determines the appropriate log mask (FIGS. 5-7) to use for each of the data collection devices present in the MDM tool 10. Basically, the log level table 52 indicates a particular log mask to apply to a given data collection device, given a particular data rate. The log masks (FIGS. 5-7) basically indicate the types (parameters) of cellular network performance metrics (data types) the data collection units are to collect (or not collect) at a given mask level. The log level table determines a log mask for all the different data collection devices which may happen to be present in the MDM tool 10. An example of a portion of a log level table 52 is shown in FIG. 4. The log level table 10 basically consists of a plurality of rows and columns of data. The left-hand rows lists reverse link data transmission rates. The column 102 lists the size of the OSI level 1 packet for the given reverse link data rate. The columns 104A and 104B list the log mask to use for a given type of Sprint-Nextel data collection unit, for a particular data transmission rate.

In this case column 104A lists the log mask to use for a given data transmission rate for a Sprint CDMA voice data collection unit 32 (FIG. 1). Column 104B lists the lists the log mask to use for a given data transmission rate for a Sprint evolution-data only (EVDO) Revision A data collection unit 32 (FIG. 1). Similarly, column 106A lists the log mask to use for a Verizon CDMA voice data collection unit 36 (FIG. 1) for a given data transmission rate. Similarly, column 106B lists the log mask to use for a Verizon EVDO Revision A data collection unit 38 (FIG. 1) for a given data transmission rate. Column 108A lists the log mask to use for a Cingular GSM voice data collection unit 40 for a given data transmission rate. Column 108B lists the log mask to use for a Cingular HSPDA data collection unit 38 (FIG. 1) for a given data transmission rate.

Figure 5:
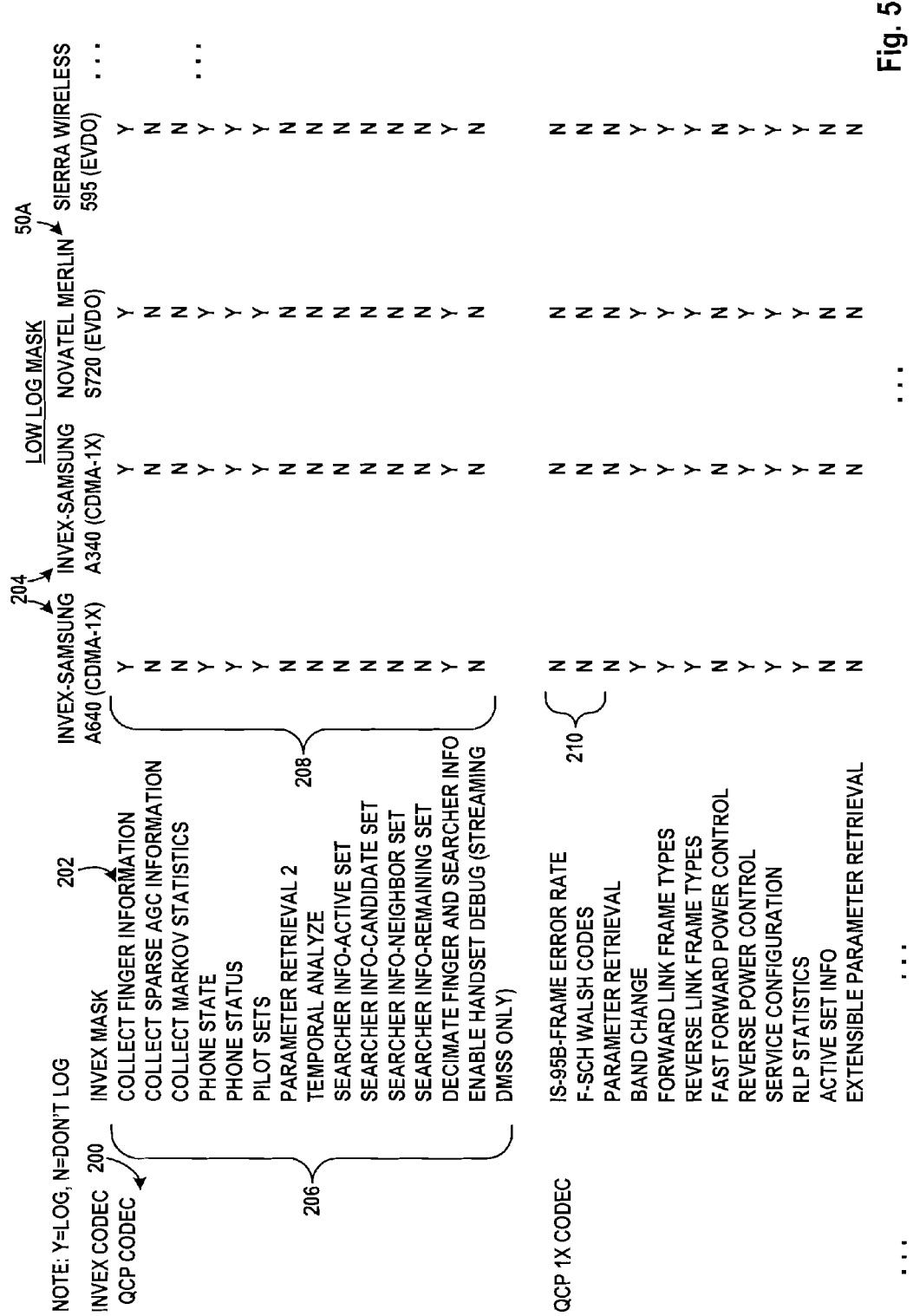
FIG. 5 is an illustration of a portion of a "low" log mask, which is used when the current data rate is relatively low. The log mask indicates which of the available, pertinent cellular network performance metrics are to be logged (i.e., recorded) and which are not logged in periods of "low" data rates. The mask includes logging instructions which are specific to particular data collection units.

Referring still to FIG. 4, for example, with a reverse link rate of 153.5 K bits per second and an OSI layer 1 packet size of 4096 bytes, the Sprint CDMA voice data collection unit is assigned the Medium log mask (FIG. 6), whereas the Cingular GSM Voice data collection unit 40 is assigned a Low log mask (FIG. 5).

The table of FIG. 4 may list multiple rows for a given data transmission rate, with varying entries in the columns 104A, 104B, 106A, 106B, 108A, 108B etc. depending on the Layer 1 packet size for that rate, the modulation technique, and the percentage of the current transmission rate that has to be devoted to signaling overhead, which may take on several possible values for a given transmission rate. All of these parameters may be used in addition to the current reverse link transmission rate in selecting a particular log mask to use (and, thereby indicating which parameters to log).

Obviously, while the log level table of FIG. 4 provides log mask information for six different types of data collection units (two each from Sprint, Verizon and Cingular) the log level table could take other forms. For example, the number of different cellular network service providers in the table, and numbers of data collection units per service provider, can of course vary. The log level table of FIG. 4 is thus offered by way of example for purposes of explanation, and not limitation. Also, the number of log masks may vary beyond "low", "medium" and "high" log masks of this disclosure.

Referring back to the flow chart of FIG. 3, at step 88, the controller 20 consults the log mask (FIGS. 5-7) that is indicated for the given transmission rate and data collection device per the log level table of FIG. 4. In the illustrated embodiment, there are three log masks, a "low" log mask shown in FIG. 5, a medium log mask shown in FIG. 6 and a "high" log mask shown in FIG. 7. Suppose step 86 indicated that for a given data collection unit a "low" log mask was to be used given the current reverse link data rate.

The "low" log mask is shown as a table 50A in FIG. 5. The table 50A includes a column 200 which lists particular codecs which may be incorporated into a particular data collection device. The log mask further relates the cellular network performance data types to log or not log to particular codecs present in the data collection units. Columns 202 lists the different cellular network performance metrics (data types) that a given codec is designed to measure during drive testing. Specific instructions for logging are reflected in the table at 208 by a Y (the performance metric is to be logged) or a N (the performance metric is not logged). The columns 204 list different types of brands or models of data collection units which may be present in the equipment of a particular manufacturer. Four of such columns are shown presented, representing particular manufacturers in Sprint data collection devices. In the "low" mask table, using the example of the Invex-Samsung A640 unit (used in CDMA voice), the log mask indicates which performance metrics are to be logged (entries with a "Y") and which performance metrics are not to be logged (entries with a "N"). Thus, for the QCP codec, the data collection instructions 208 for the Invex-Samsung A640 unit indicates that the following performance metrics are not collected—Sparse automatic gain control (AGC) information, Markov statistics, Parameter Retrieval 2, Temporal analyze, Search information related to Active Set, Candidate Set, Neighboring Set, Remaining Set, Enable Handset Debug. As another example, for the same unit with a QCP 1X codec, data on the IS-95B Frame Error Rate and F-SCH Walsh Codes are not collected as indicated at 210 in the table. Although not shown in the example of FIG. 4, the log mask may indicate that a data collection device is to be converted from an active state to an inactive state—basically temporarily cease data collection. Alternatively, for some devices, the low log mask may indicate that all data collection parameters are logged.

The controller 20 instructs the data collection units 32, 34, 36, 38, . . . as to which performance metrics to collect depending on the results of the low mask table of FIG. 5. As shown in step 90 of FIG. 3, the data collection proceeds per the mask of FIG. 5.

At step 92 the transmission of the data to the BTS and the drive test server 70 proceeds. The collection and transmission of data is such that, ideally, the collection occurs at a rate which is less than or equal to the data transmission rate from the transmitter 28 to the BTS 60 of FIG. 1, so as to enable continuous data acquisition and transmission in real-time without any substantial buildup of data in the MDM tool 10.

The step of checking the reverse link data rate and adaptively controlling the collection of date is preferably performed frequently, e.g., on a periodic basis of every 10 seconds or every minute. At step 94, the controller 20 checks to see if a timer has expired indicating it is time to recheck the data rates, and if the answer is yes the process loops back as indicated at 96. If No, processing returns via branch 70 and the data acquisition (step 90) and data transmission (step 92) and check timer steps (94) repeat.

The process ends 98 when the drive test route has been completed. Thus, the process 80 continues to execute from the beginning of the drive test to the end.

Figure 6:
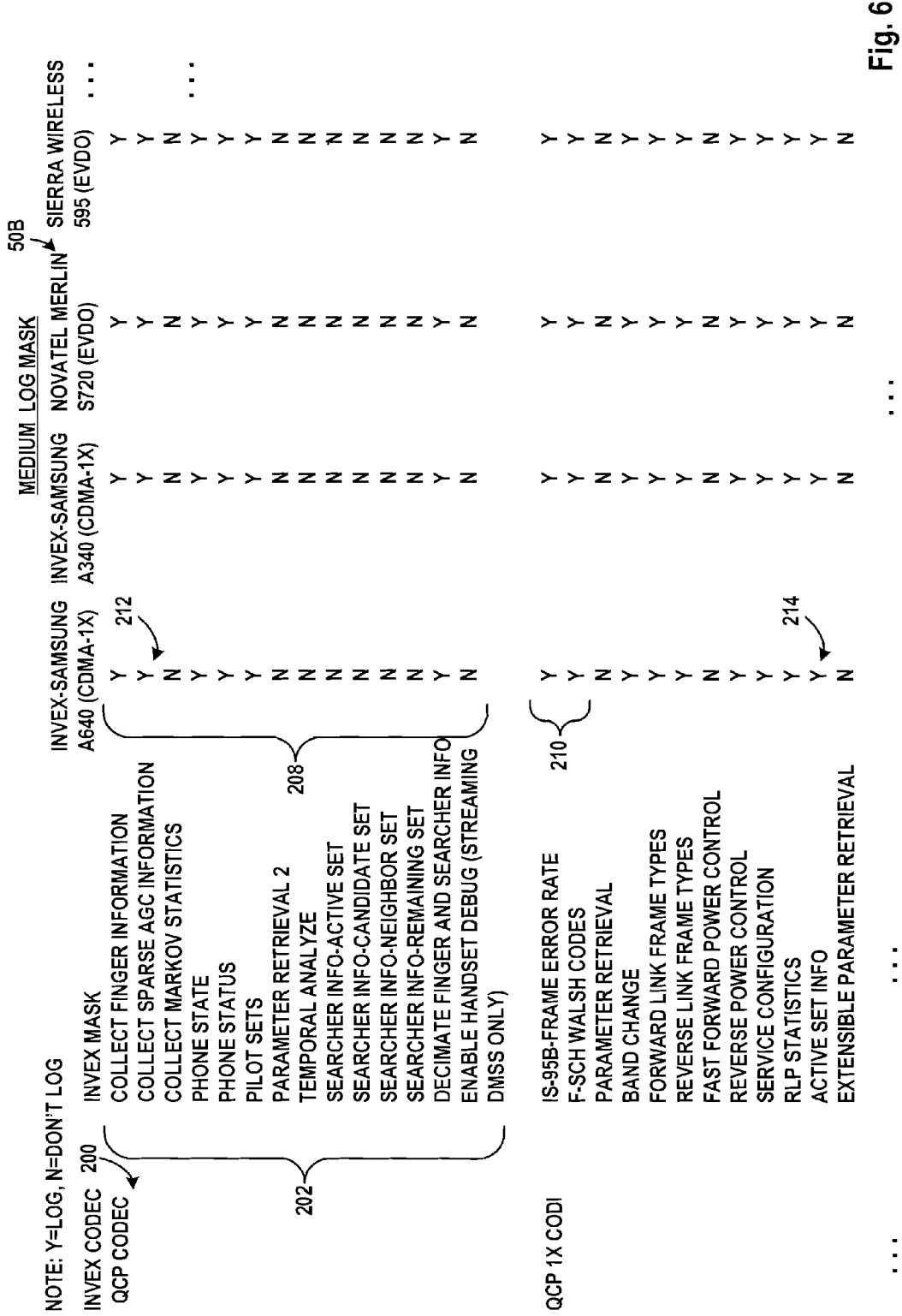
FIG. 6 is an illustration of a portion of a "medium" log mask, which is used when the current data rate is between a relatively low rate and a relatively high rate. The log mask indicates which of the available, pertinent cellular network performance metrics are to be logged (i.e., recorded) and which are not logged in periods of "medium" data rates. Again, as with FIG. 5, the mask includes logging instructions which are specific to particular data collection units.

FIG. 6 shows a "medium" log mask table, which is entered when the log level table 52 of FIG. 4 indicates that, for a given data collection unit and data transmission rate, a "medium" log mask is to be used. As will be appreciated, generally speaking more data collection occurs using the "medium" log mask of FIG. 6 as compared to the low log mask of FIG. 5. For example, as indicated at entry 212 in the table, the "Collect Sparse AGC Information" field is marked "Y" in the medium log mask table 50B whereas it was marked "N" in the low mask table 50A of FIG. 5. Similarly, the IS-95B Frame Error Rate and F-SCH Walsh Codes are marked "Y" (see 210) in the medium log mask table 50 B whereas they were marked "N" in the low mask table 50A of FIG. 5. Likewise, the Active Set Info parameter is marked Y in table 50B but N in table 50A. As will be apparent, the engineer creating the log masks may chose which parameters to collect data for a given log mask.

FIG. 7 shows an example of a portion of a "high" log mask table 50C, which is consulted with the log level table of Figure indicated "high" for any given combination of data transmission rate and data collection device. Generally speaking, the "high" log mask table 50C will provide for greater data collection than the medium log mask table 50B of FIG. 6. For example, as indicated at 216 the Temporal Analyze parameter 216 is marked "Y" in the high mask table of FIG. 7 but is shown as "N" in the medium and low mask tables of FIGS. 5 and 6. The same is true for the Fast Forward Power Control parameter indicated at 218 in FIG. 7.

While three log mask tables are shown, still further log mask tables could be created and provided for in the log level table 52 of FIG. 4. Again, the composition of the table may depend on such factors and the number and type of different data collection devices present in the MDM tool.

The designer of the log mask table will be able make decisions on which parameters to log based on such factors as the size of the data that is collected for a given parameter, the frequency that such data is collected, and the importance of the parameter in providing specific information of interest to the network operator or analyst. Also, in some situations it will be desirable to increase the amount of information that is collected in order to provide more information as to why certain network conditions are occurring. Thus, the log mask table and/or the log level table can be revised to change the entries. For example, even if the log level table indicates "medium" logging, all parameters for a given codec of a given wireless carrier can be logged. The arrangement of log parameters across the entire MDM tool for a given reverse link rate will also be able to be arrived at since the designer of the tables will generally know in advance the particular distribution of data collection units in the MDM tool and prioritize data logging appropriately.

While one MDM tool 10 is shown in FIGS. 1 and 2, a given cellular service provider may have many of such tools in order to measure performance of the entire network. Each MDM tool 10 may be configured as described herein. By providing generic log level and log mask tables the tool can be configured for any particular arrangement of measurement devices 32, 34, 36, 38, 40 that happen to be present in any particular MDM 10. Alternatively, each MDM tool 10 in the set of tools could have its own custom configuration of the log level table and the log mask tables.

From the foregoing, it will be appreciated that a method of collecting cellular network performance data in a measurement tool, comprising the steps of:

(a) determining a current data rate for transmission of data between the measurement tool and a network node in a cellular network (step 84 in FIG. 3, explained above); and (b) adaptively controlling the collection of network performance data by data collection units in the measurement tool in accordance with variations in the current data rate (explained in steps 86, 88 and 90 in FIG. 3). The controlling, e.g., through the use of the log level tables and the log masks (FIGS. 4-7) is such that the total rate of collection of data by all the data collection devices is less than or equal to the rate at which the data may be transmitted to the network node (BTS 60 of FIG. 1) thereby allowing real-time collection and transmission of drive test data throughout the entire drive test.

As illustrated in FIG. 3 by the return branch 96, the steps (a) and (b) are repeated continuously. As indicated in FIG. 1, the steps (a) and (b) can be performed in a drive test measurement tool 10 which installed in a motor vehicle 12 and while the motor vehicle is driven through a geographic region served by cellular network.

It will also be appreciated that a cellular service provider system has been described including a network (58, FIG. 1) providing cellular telephony services to roaming subscribers; a drive test server (70) configured to analyze drive test routes; and a plurality of drive test measurement tools 10, each of which comprises:

(a) a plurality of data collection units 32, 34, 36, 38, 40, collecting performance data of the network 58, (b) a transmitter 28 for transmitting the cellular network performance data to a node in the network; and (c) an adaptive controller 20 coupled to the plurality of data collection units 2, 34, 36, 38, 40 controlling the collection of cellular network performance data by the data collection units in accordance with variations in the current data rate of the transmitter 28, wherein the rate of the collection of the cellular network performance data by the data collection units is adaptively controlled by the controller 20 so as to be less than or equal to the current data rate, thereby enabling the drive test measurement tool to transmit all the data collected by the data collection units to the node substantially in real time.

As explained above in conjunction with FIGS. 5-7, in one embodiment the memory 50 in the controller 20 stores at least a low log mask, a medium log mask and a high log mask for each of a plurality of data collection units, the low log mask corresponding to relatively low data rates, the high log mask corresponding to relatively high data rates, and the medium log mask corresponding to data rates between the low rates and the high rates. Additional tables are of course possible.

While a number of exemplary aspects and embodiments have been discussed above, those of skill in the art will recognize certain modifications, permutations, additions and sub-combinations thereof as being present in the disclosure. It is therefore intended that the following appended claims and claims hereafter introduced are interpreted to include all such modifications, permutations, additions and sub-combinations as are within their true spirit and scope.

I claim:

1. A drive test measurement tool for measuring performance of a cellular network, comprising:

a plurality of data collection units for collecting cellular network performance data;

a transmitter for transmitting the cellular network performance data to a node in the cellular network; and an adaptive controller coupled to the plurality of data collection units for controlling the collection of the cellular network performance data by the data collection units in accordance with variations in the current data rate of the transmitter, wherein the rate of the collection of the cellular network performance data by the data collection units is adaptively controlled by the controller so as to be less than or equal to the current data rate, thereby enabling the drive test measurement tool to transmit all the data collected by the data collection units to the node substantially in real time; and a memory storing a log level table and at least one log mask, wherein the log level table indicates which of the at least one log masks to apply, given a particular data rate, and wherein the log mask indicates the types of cellular network performance data the data collection units are to collect.

2. The drive test measurement tool of claim 1, wherein the memory stores at least a low log mask, a medium log mask and a high log mask for each of a plurality of data collection units.

3. The drive test measurement tool of claim 1, wherein the at least one log mask further relates the cellular network performance data types to particular codecs present in the data collection units.

4. The drive test measurement tool of claim 1, wherein the adaptive controller takes into account at least one of (a) a Layer 1 packet size, (b) a portion of the current transmission rate that has to be devoted to signaling overhead, and (c) a modulation technique used in the reverse link transmission, in controlling the collection of cellular network performance data by the data collection units.

5. A method of collecting cellular network performance data in a measurement tool, comprising the steps of:
(a) determining a current data rate for transmission of data between the measurement tool and a network node in a cellular network; and
(b) adaptively controlling the collection of network performance data by data collection units in the measurement tool in accordance with variations in the current data rate so as to keep the total rate of collection of data to be less than or equal to the rate at which the data may be transmitted to the network node,
wherein the adaptive controlling of the collection of network performance data is in accordance with a log level table and at least one log mask,
wherein the log level table indicates a log mask to apply, given a particular data rate and
wherein the log mask indicates the types of cellular network performance data the data collection units are to collect.

6. The method of claim 5, wherein the selective limitation of the collection of network performance data includes converting at least one of the data collection devices from an active state to an inactive state.

7. The method of claim 5, wherein steps (a) and (b) are repeated continuously.

8. The method of claim 7, wherein the steps (a) and (b) are performed in a drive test measurement tool installed in a motor vehicle driven through a geographic region served by cellular network.

9. A cellular service provider system comprising:
a network providing cellular telephony services to roaming subscribers;
a drive test server configured to analyze drive test routes;
a plurality of drive test measurement tools, each of which comprises:
(a) a plurality of data collection units collecting performance data of the network,
(b) a transmitter for transmitting the cellular network performance data to a node in the network; and
(c) an adaptive controller coupled to the plurality of data collection units controlling the collection of cellular network performance data by the data collection units in accordance with variations in the current data rate of the transmitter,
wherein the rate of the collection of the cellular network performance data by the data collection units is adaptively controlled by the controller so as to be less than or equal to the current data rate, thereby enabling the drive test measurement tool to transmit all the data collected by the data collection units to the node substantially in real time,
wherein each of the measurement tools further comprises a memory storing a log level table and at least one log mask,
wherein the log level table indicates which of the at least one log masks to apply, given a particular data rate, and
wherein the log mask indicates the types of cellular network performance data the data collection units are to collect.

10. The system of claim 9, wherein the memory stores at least a low log mask, a medium log mask and a high log mask for each of a plurality of data collection units, the low log mask corresponding to relatively low data rates, the high log mask corresponding to relatively high data rates, and the medium log mask corresponding to data rates between the low rates and the high rates.

11. The system of claim 9, wherein the at least one log mask further relates the cellular network performance data types to particular codecs present in the data collection units.

12. The system of claim 9, wherein the current data rate of the transmitter is a running average of the data rate.

13. The system of claim 9, wherein the adaptive controller further uses a Layer 1 packet size for the current data transmission rate in controlling the collection of cellular network performance data by the data collection units.

14. The system of claim 9, wherein the adaptive controller further uses a modulation technique used in the current data transmission in controlling the collection of cellular network performance data by the data collection units.

15. The system of claim 9, wherein the adaptive controller further takes into account a portion of the current transmission rate that has to be devoted to signaling overhead in controlling the collection of cellular network performance data by the data collection units.

* * * * *